March 5, 1957  B. SPRINGER  2,784,374
ALTERNATING CURRENT MEASURING BRIDGE
Filed April 22, 1952

INVENTOR
BERTHOLD SPRINGER
BY
Morgan, Finnegan & Durham
ATTORNEYS.

United States Patent Office 2,784,374
Patented Mar. 5, 1957

2,784,374

ALTERNATING CURRENT MEASURING BRIDGE

Berthold Springer, Boulogne-sur-Seine, France, assignor to Landis & Gyr, A. G., Zug, Switzerland, a body corporate of Switzerland Application April 22, 1952, Serial No. 283,531

Claims priority, application Switzerland May 2, 1951

1 Claim. (Cl. 324—57)

The present invention relates to a novel alternating current measuring bridge of the Wheatstone type by means of which the impedance of an electrical element may readily be determined.

Objects and advantages of the invention will be set forth in part hereinafter and in part will be obvious herefrom, or may be learned by practice with the invention, the same being realized and attained by means of the instrumentalities and combinations pointed out in the appended claim.

The invention consists in the novel parts, constructions, arrangements, combinations and improvements herein shown and described.

An object of the present invention is to provide a novel alternating current measuring bridge whereby if alternating current is applied to one diagonal of said bridge, the indicating means of said bridge will only read zero if the voltage across the other diagonal is zero.

A further object of my invention is to provide a novel alternating current measuring device which is simple in construction, inexpensive to make and is of high precision.

The accompanying drawings, referred to herein and constituting a part hereof, illustrate two embodiments of the invention, and together with the description, serve to explain the principles of the invention.

Various types of electrodynamic instruments have been previously used in alternating current measuring bridges. These instruments usually included a field coil, a moving coil and an iron or steel magnetic circuit as detectors or null indicators. In instruments termed vibration galvanometers, the basic form of direct current moving coil instruments is retained, the iron or steel magnet being replaced, however, by an electromagnet. In operation these instruments permit the high sensitivity and accuracy of direct current moving coil instruments to be obtained.

In the above described instruments, the deflection $\alpha$ of the pointer on the detecting means takes place according to the equation $\alpha = Ee \cos \phi$ wherein E and $e$ respectively indicate the effective value of the voltage applied across one diagonal of the bridge and the voltage to be measured across the other diagonal and $\phi$ is the phase angle between them. It is evident therefore from a study of the above formula that an instrument of this kind will indicate $\alpha$ as zero when $\cos \phi = 0$, notwithstanding that there may be a finite value of $e$, with the result that a satisfactory tuning of the alternating current bridge is not always possible.

In accordance with the present invention, the above disadvantage of obtaining a zero reading although there may be a finite voltage across the diagonal of the bridge being measured is eliminated. My invention is directed to a Wheatstone type measuring bridge comprising an electrical element of an unknown impedance, a standard impedance and two non-inductance resistances and a balancing resistance connected in the bridge leg containing the standard impedance. An alternating current voltage is induced across one diagonal of said bridge and connected across the other diagonal of the bridge is at least one electrodynamic detector or null indicator having a field coil, a moving coil and an iron magnetic circuit, said field coil being arranged in parallel with either a non-inductive resistance or a capacity of a series circuit, so that said detector gives only one of the vector components of the magnitude to be indicated. An alternating current is induced across the other diagonal of said measuring bridge.

By manipulating the known resistances as hereinafter described in detail, the pointer of the indicating means will read zero when the voltage drop across the diagonal of the bridge being measured is zero. Hence a satisfactory tuning of the bridge is obtained thus eliminating the possibility of false zero readings on the indicator means. When the pointer reads zero, the value of the unknown impedance can then be calculated from the conventional Wheatstone bridge formula for the values of the standard impedance is known as well as the two non-inductance resistances at this zero point.

In order to describe the invention more specifically reference is now made to the drawings.

Figure 1:
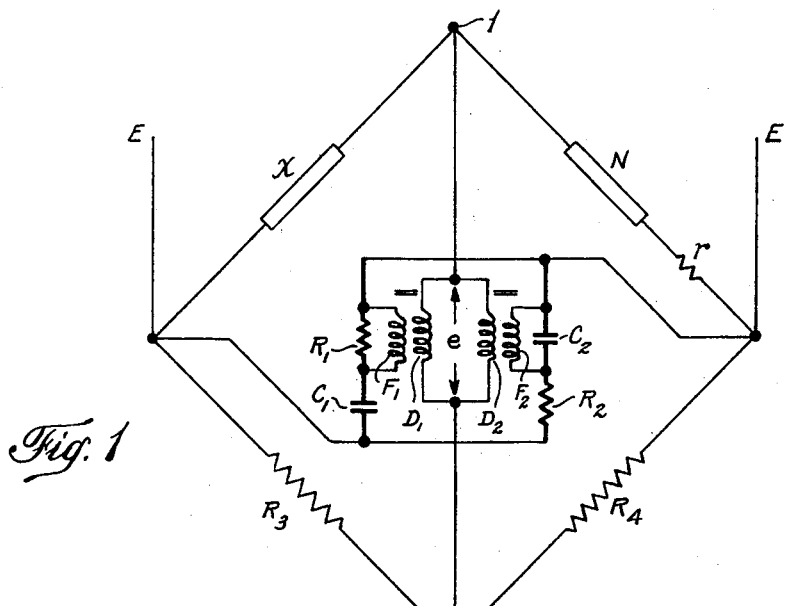
Figure 1 is a diagramatic view of one embodiment of my invention disclosing an alternating current bridge containing two current detectors.

In Figure 1, X indicates an impedance to be measured, N a standard impedance and $R_3$, $R_4$ two non-inductive resistances, which together form a Wheatstone type bridge fed by an alternating voltage E. The balancing condition is $X = N \cdot R_3 / R_4$. The quotient $R_3 / R_4$ is scalar value and serves for determining the range of measurement, while X and N are generally complex quantities. In order to fulfill the balancing condition the real as well as the imaginary components of the impedances X and N must be proportional.

In Figure 1, a resistance $r$ is therefore also shown, which serves for balancing the real component of the impedance N. So long as the alternating current bridge shown is not completely balanced, there is an alternating voltage $e$ between the terminals 1, 2. Such voltage is now measured by two iron magnetic circuit electrodynamic detectors, each of which comprises a moving coil, $D_1$ and $D_2$ respectively, and a field coil $F_1$ and $F_2$ respectively. The two field coils are not connected directly to the voltage E, but in parallel with two series circuits connected directly to the voltage E and consisting of non-inductive resistances $R_1$ and $R_2$ and a capacities $C_1$ and $C_2$ in such a manner that the field coil $F_1$ is in parallel with the non-inductive resistance $R_1$ of the first series circuit and the field coil $F_2$ is in parallel with the capacity $C_2$ of the second series circuit.

Figure 2:
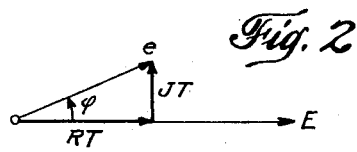
Figure 2 is a vector diagram of the alternating voltages across the two diagonals of the measuring bridge disclosed in Figure 1.

If the alternating voltages E and $e$ are represented as vectors (see Figure 2), it will be seen that $e$ will be always smaller than E and can even be zero. The angle of phase displacement $\varphi$ can, according to the condition of balance of the bridge, take values between 0° and 360°. According to known rules, the vector $e$ can be resolved into a real component $RT$ and an imaginary component $jT$. These components are indicated directly by the two detectors $D_1$, $F_1$ and $D_2$, $F_2$. The constants of the series circuits $R_1$, $C_1$ and $R_2$, $C_2$ are so chosen that the phase angle $\varphi$ between the magnetising current $i_F$ of the field coils $F_1$, $F_2$ and the alternating voltage E in one case is 0° and in the other case 90°. The same phase displacement then also occurs between the magnetic fields of the field coils and the voltage E. If the magnetic field, in which the moving coil can turn, is in phase with the voltage E, the instrument in question indicates only the amount of the real component RT of the vector $e$. Exactly in the same manner the magnetic field can be rotated in phase through 90° relatively to E and the instrument in question then indicates only the amount of the imaginary component $jT$ of the vector $e$. The conditions, which are then to be maintained, are given from the following considerations:

For the field coil $F_1$, which is connected in parallel with the resistance $R_1$ the following equation applies:

$$E = r_F + \frac{L_F}{C_1 R_1} + j\left(\omega L_F - \frac{1}{\omega C} - \frac{r_F}{R_1 \omega C_1}\right) \quad (1)$$

where $i_F$ indicates the magnetising current, $r_F$ the pure resistance, $L_F$ the inductance of the field coil $F_1$. From this it follows that $$\tan \varphi = \frac{C_1 R_1 \omega^2 L_F - R_1 - r_F}{r_F R_1 \omega C_1 + L_F}$$

If $\varphi = 0$, $\tan \varphi$ must be $=0$ and $CR_1 \omega^2 L_F - R_1 - r_F = 0$. Thus when $\varphi = 0$, the conditions $$C_1 = \frac{R_1 + r_F}{R_1 \omega^2 L_F}$$

and $$R_1 = \frac{r_F}{\omega^2 L_F C_1 - 1} \quad (2)$$

must be fulfilled.

For the field coil $F_2$, which is connected in parallel with the capacity $C_2$, there applies by analogy $$\frac{E}{i_F} = r_F \varphi R_2 - \omega^2 L_F C_2 R_2 + j\omega(L_F + C_2 R_2 r_F) \quad (3)$$

and thus $$\tan \varphi = \frac{(L_F + C_2 R_2 r_F)\omega}{r_F + R_2 - \omega^2 L_F C_2 R_2}$$

If now $\varphi = 90°$, $\tan \varphi$ equals $(X)$. This is the case, when $r_F + R_2 - \omega^2 L_F C_2 R_2 = 0$. It will be readily seen therefrom that there results the same conditions as are given under (2). Care should be taken that in the first case, however, the resistance $R_1$ is in parallel with the field coil $F_1$, while in the second case the capacity $C_2$ is in parallel with the field coil $F_2$. If the above obtained conditions are fulfilled, the position of the pointer of the instrument $F_1 D_1$ will immediately show whether the real component RT is small or large, negative or positive. Consequently it can be brought to zero simply by altering $R_3$ or $R_4$. The same considerations apply for the position of the pointer of the instrument $F_2 D_2$ which is brought to zero by regulating the resistance $r$. In both cases it can be clearly recognized whether the corresponding resistance has to be increased or reduced, so that the balancing of the bridge is much facilitated.

An important simplification of the above described apparatus is afforded when care is taken that the same magnetising current $i_F$ flows in the field coils of both instruments. Instead of two instruments a single one is then sufficient, the field coil of which is connected first as a shunt to the resistance and then as a shunt to the capacity of one and the same series circuit R, C. The measurement of the real and imaginary components are then undertaken successively on the same instrument. In this case, the following conditions are to be fulfilled:

$$R = \omega L_F - r_F$$

and $$C = \frac{1}{\omega R} \quad (4)$$

Figure 3:
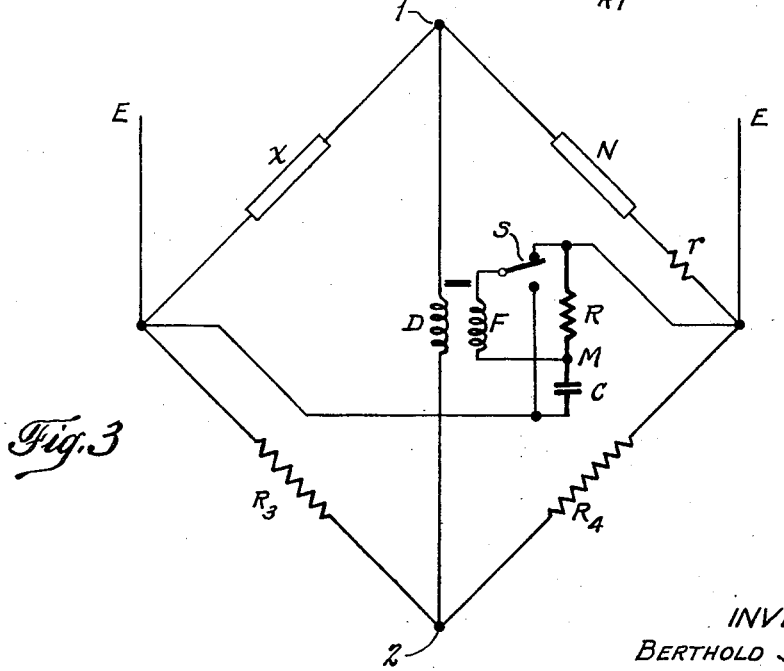
Figure 3 is a diagramatic view of another embodiment of my invention disclosing one detector.

In both cases $i_F = E/(r_F + \omega L_F)$. This result is easily obtained when the real component of Equation 1 is made equal to the imaginary component of Equation 3 and the condition (2) obtained above is taken into consideration. In Figure 3 there is shown a simplified circuit of this kind with only one instrument. A moving coil D of an iron magnetic circuit electrodynamic detector is connected to the terminals 1, 2 of an alternating current bridge of the same kind as that already discussed in Figure 1. Directly connected to the voltage E is a series circuit comprising a capacity C and an ohmic resistance R. The mid tapping point M thereof is connected to one end of the field coil F of the instrument, the other end of which is led to the movable contact of a change-over switch S. The two outer contacts of the changeover switch S are connected to the two ends of the series circuit R, C. From Figure 3, it will be readily seen that in the position shown of the movable contact of the change-over switch S, the resistance R and in the other position the capacity C is connected in parallel with the field coil F. If the values have been chosen for R, C according to the conditions in Equation 4, the instrument, in the position of change-over switch S shown, indicates only the imaginary component and in the other position of the switch only the real component.

The apparatus above described affords a comparatively high degree of accuracy. The balancing of the alternating current bridge does not take place by the uncertain seeking of the mid point of a minimum, but by a clear zero point reading, whereby in the immediate proximity to the zero point any setting errors are indicated linearly. Harmonics have no effect on the indications, so that an exactly sine-wave-shaped source of voltage is not required.

The invention in its broader aspects is not limited to the specific mechanisms shown and described but departures may be made therefrom within the scope of the accompanying claim without departing from the principles of the invention and without sacrificing its chief advantages.

What is claimed is:

An alternating current measuring bridge comprising, a magnetic circuit electrodynamic detector connected across one diagonal of a measuring bridge, a second diagonal of said bridge across which an alternating current is adapted to be applied, a series circuit corresponding to the detector between the terminals of said second diagonal, said detector comprising a moving coil and a field coil, one end of said field coil being connected between a non-inductive resistance and a capacity of said series circuit, a change-over switch connected to the other end of said field coil whereby said end is adapted to be alternatively connected to each end of said series circuit, the elements of said series circuit being so dimensioned that said detector indicates the real component of the voltage to be measured when the end of the field coil connected to the switch is connected to one end of said series circuit and indicates the imaginary component of said voltage when said end is connected to the opposite end of said series circuit.

References Cited in the file of this patent

UNITED STATES PATENTS

| Number | Name | Date |
|---|---|---|
| 1,475,240 | Osborne | Nov. 27, 1923 |
| 1,496,786 | Shackelton | June 10, 1924 |
| 2,300,958 | Oman | Nov. 3, 1942 |
| 2,490,377 | MacLean | Dec. 6, 1949 |
| 2,595,675 | Jaynes | May 6, 1952 |
| 2,641,632 | Gamertsfelder | June 9, 1953 |